United States Patent [19]

Doran et al.

[11] Patent Number: 5,739,654
[45] Date of Patent: Apr. 14, 1998

[54] PRECISION TOOL CONTROL SYSTEM FOR A WORKPIECE POSITIONING APPARATUS

[75] Inventors: Samuel Kay Doran, Wappingers Falls, N.Y.; Erwin Ernst Weissmann, Southbury, Conn.

[73] Assignee: International Business Machines Corporation, Armonk, N.Y.

[21] Appl. No.: 715,826

[22] Filed: Sep. 19, 1996

Related U.S. Application Data

[63] Continuation of Ser. No. 359,238, Dec. 19, 1994, abandoned.

[51] Int. Cl.$^6$ .................................................. G05B 13/00
[52] U.S. Cl. ........................... 318/561; 318/601; 318/632
[58] Field of Search .................................. 318/600, 601, 318/611, 632, 624, 677, 680, 560, 561, 563, 569, 567, 568.22, 568.24, 590, 685, 696; 341/118, 139

[56] References Cited

U.S. PATENT DOCUMENTS

| | | | |
|---|---|---|---|
| 4,016,396 | 4/1977 | Hassan et al. | 219/121 EB |
| 4,141,016 | 2/1979 | Nelson | 343/858 |
| 4,260,936 | 4/1981 | Sun | 318/599 X |
| 4,290,000 | 9/1981 | Sun | 318/566 |
| 4,456,860 | 6/1984 | Cann et al. | 318/561 |
| 4,472,731 | 9/1984 | vanGurp et al. | 358/11 |
| 4,549,260 | 10/1985 | Saito et al. | 318/632 X |
| 4,549,286 | 10/1985 | Langeraar et al. | 367/97 |
| 4,592,094 | 5/1986 | Ufkes | 455/164 |
| 4,769,562 | 9/1988 | Ghisio | 307/469 |
| 5,058,072 | 10/1991 | Kashimura | 365/203 |
| 5,140,242 | 8/1992 | Doran et al. | 318/640 |

OTHER PUBLICATIONS

J. M. Fournier, et al., Special Brief Papers, "A 130-MHz 8-b CMOS Video DAC for HDTV Applications" IEEE Jrl. of Solid-State Circuits, v. 26, No. 7, pp. 1073-1077, Jul. 1991.

*Primary Examiner*—David S. Martin
*Attorney, Agent, or Firm*—Whitham, Curtis, Whitham & McGinn; Eric W. Petraske

[57] ABSTRACT

A servo controlled tool and stage positioning system. A circuit in the tool positioning servo control circuit removes unwanted glitches. Glitches are generated by servo control DACs when the servo is at rest. The circuit selectively blocks these glitches from being passed to the tool positioning circuit only when the stage is at rest.

9 Claims, 3 Drawing Sheets

|  | INPUTS | OUTPUT (B8) |
|--|--|--|
|  | MSB          LSB | OUT |

```
1 1 1 1 1 1 1 1 1 1 1    1
                         1
1 0 0 0 0 0 0 0 0 0 1    1
1 0 0 0 0 0 0 0 0 0 0    0
0 1 1 1 1 1 1 1 1 1 1    0
0 1 1 1 1 1 1 1 1 1 0    1
                         1
0 0 0 0 0 0 0 0 0 0 0    1
```

PLS173 TRUTH TABLE

LOOPING ON STATES:
10000000001
10000000000
01111111111
01111111110

5,739,654

PRECISION TOOL CONTROL SYSTEM FOR A WORKPIECE POSITIONING APPARATUS

This is a Continuation Patent Application based on U.S. patent application Ser. No. 08/359,238, filed on Dec. 19, 1994 now abandoned.

FIELD OF THE INVENTION

The present Invention is related to servo controlled positioning apparatus and more particularly to a servo controlled workpiece positioning apparatus for accurately positioning and thereafter maintaining the position of a workpiece in relation to a tool.

BACKGROUND OF THE INVENTION

Servo positioning systems for accurately positioning a workpiece in relation to a tool, such as an electron beam (E-beam) probe or lithographic tool, are known. See for example U.S. Pat. No. 5,140,242 to Doran et al., entitled "Servo Guided Stage System", assigned to the assignee of the present invention and incorporated herein by reference. In Doran, the stage is tightly controlled to provide very precise incremented steps from one location to the next. At the end of each step, there is a certain amount of vibration or flutter as the stage settles into its new position. Once settled, the stage is to remain motionless.

In some Electron beam (E-beam) stepper systems, referred hereinafter to as "Wish You Were There" steppers, a correction, known as the "Wish You Were There" correction, is applied to the tool in order to facilitate placement accuracy to within a few nanometers. The "Wish You Were There" correction, which is applied to the tool as the stage moves into position, causes beam deflection to compensate for stage settling and flutter. Thus, the "Wish You Were There" correction synchronizes the E-beam to the end of move stage movement.

FIG. 1 is a plan view of the stepper stage of U.S. Pat. No. 4,016,396 to Hassan et al., entitled "Precision Tool and Workpiece Positioning Apparatus", assigned to the assignee of the present invention and incorporated herein by reference, is an example of a stepper that employs a "Wish You Were There" correction. In FIG. 1, a first element or tool 50 is located above a second element or workpiece W mounted on an X-Y stage 52. The tool includes a drill chuck 51 and drill 51A. Stage drive means including motors 54 and 56 are connected respectively for driving the X and Y portions of the X-Y stage 52, the motors being responsive to a desired position address from a control unit 58. The position of the workpiece W, and thus the stage 52 in the X direction is controlled by a X signal output along line 60 to the X servo circuitry 62, while the Y direction of the X-Y stage is controlled by an address along line 64, emanating from the control 58, to the Y servo circuitry 66. Positional feedback information is fed back to the X and Y servo circuitry through feedback loops 62A, and 66A respectively. Velocity feedback is fed back respectively through lines 54A and 56A to the stage drive.

Both the X and Y servo circuitry 62 and 66 are set so that when the X-Y stage 52 and thus the workpiece W is within a preset predetermined tolerance, or within a small site, (that is the positional difference between the desired position and the actual position is within a very small, tolerance) the motors 54 and 56 can be latched. Thereafter, the "Wish You Were There" correction is applied. So, any positional difference that still exists, albeit very small, is fed to an X-tool control circuitry 68 and Y-tool control circuitry 70 to effect a minor correction to the tool 50, causing the tool 50 to be realigned to the workpiece through X force actuator 72 and Y force actuator 74, respectively.

It is understood that, with proper modifications, an E-beam probe or lithography tool could be substituted for the tool 50 of this figure.

It was found that pattern errors occurred on workpieces on these "Wish You Were There" steppers.

PURPOSES OF THE INVENTION

It is a purpose of the present invention to eliminate beam flutter in E-beam tool systems.

It is yet another purpose of the present invention to reduce pattern errors occurring in E-beam lithography tool systems.

SUMMARY OF THE INVENTION

The present invention is a workpiece positioning stage and a tool positioning control circuit therefor. The tool positioning control circuit includes a glitch elimination circuit having means for identifying a glitch sensitive condition and means for blocking glitches during the identified glitch sensitive condition responsive to said glitch identification means. The de-glitching circuit selectively blocks glitches from the tool, making the tool more accurate and reliable.

DESCRIPTION OF THE INVENTION

The pattern errors on workpieces on "Wish You Were There" steppers occurred when the stage was at rest, motionless. This is well after the stepper had completed stepping to a new position and critical exposure work had begun. The E-beam would inexplicably jump, often, several times. Depending on the use of the tool, each such jump could cause pattern errors or defective parts. The source of the destructive flutter in prior art servo controlled E-Beam systems, it was discovered, is the Digital to Analog Converters (DACs) used to interface between the system's laser position transducer and both the servo system control and the E-beam position correction.

A typical 12 bit DAC has an output range of ±10 Volts corresponding to a binary range of 000000000000–111111111111 and a resolution of 20/4096 Volts or 4.88 mV. In the prior art stage stepper, each DAC receives digital positional information from the laser position transducer. The DAC converts positional information to a voltage, known as an error signal. Based on their respective error signals, the servos drive the stage to a new position. As noted above, to reduce the effective stepping time, once the stage is near its new position, a second error signal, the "Wish You Were There" correction, offsets and synchronizes the E-beam with the work piece on the stage. Using the "Wish You Were There" correction improves stepper throughput by allowing tool operation to begin before the stage has come to a complete stop physically. As the stage settles into its new position, the error signal approaches zero. Ideally, with the stage stopped and in position, the error signal is zero to both pair of DACs, i.e., the stage servo pair and the tool control pair.

Figure 1:
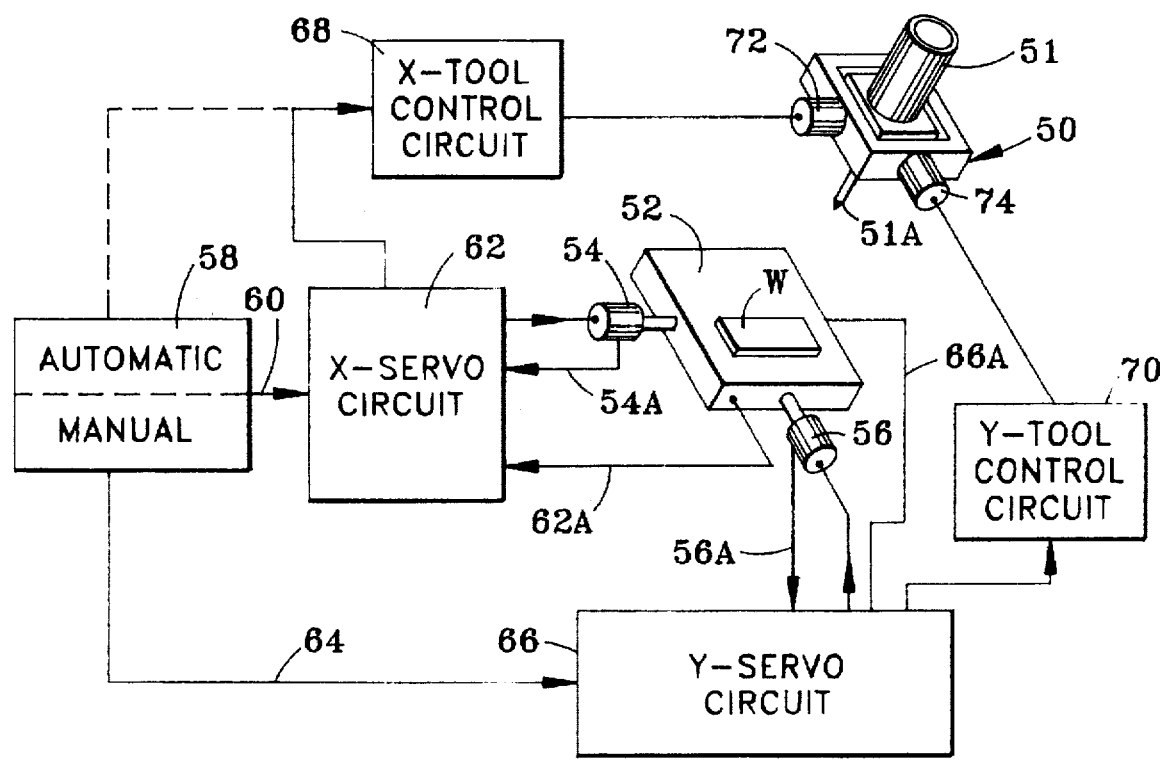
FIG. 1 is a prior art "Wish You Were There" stepper stage.
Figure 2:
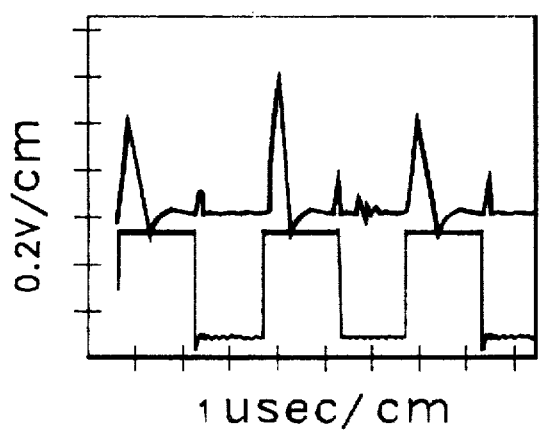
FIG. 2 is a photograph of an oscilloscope trace of a 12 bit DAC output used in a prior art "Wish You Were There" stepper stage.

However, when the stage is in position, even though these DAC outputs are to remain at 0V, transients, known as glitches, were found on the DACs' outputs. FIG. 2 is a photograph of an oscilloscope trace (the top trace) of a 12 bit BURR-BROWN DAC output with the problem causing glitches. The bottom trace is provided as a timing reference and represents the inputs switching. The glitches in the top trace ranged in magnitude up to 600 mV. These 600 mV glitches occurred even though the DAC's binary input only varied from its midpoint (which corresponds to 0.000V output voltage) by 1 bit, i.e., between 011111111111 (−4.88 mV) and 100000000000 (0.000V). Further, even though identical glitches usually appeared both on the servo control DACs and on the E-beam position control DACs, it was determined that the stepper stage's mass sufficiently, mechanically filtered out the unintentional positional glitch, while the E-beam tool faithfully reproduced it. Consequently, the glitch was written into the pattern as a flaw. This flaw in the prior art servo controlled systems always occurred at a critical point, i.e., when both the stage and the beam are in position and all stage movement is stopped. At that point, although the error signal from both pairs of DACs is supposed to be zero, minor fluctuations in the stage could cause a spray of glitches.

Typically, glitches are a result of a race condition in the DAC that occurs when two or more of the DAC's inputs switch. Some bits propagate through the DAC faster than others. The result is that, for a brief period, the DAC sees a false input. Worst case is when all of the DACs' inputs switch, at the DACs mid-range (0.000V for this application). Because of the race condition, this input can appear as all ones or all zeros causing the DAC to attempt to force its output to +10V or −10V respectively. After the DAC starts to drive its output full scale, the rest of the input bits propagate through ending the race, the DAC forces its output back to zero. The best DACs have been carefully designed to minimize glitch amplitude and width. Most manufacturers do not guarantee that their DACs are glitch free. Instead, they specify that their DACs' outputs will settle to within 0.01% of its steady state output voltage in a few micro seconds. Furthermore, glitches occurring at time other than this critical period, when the stage is in position, can be tolerated ordinarily.

Therefore, having identified this heretofore unrealized problem, the present invention is an improved servo guided stage system wherein the critical glitches have been eliminated from the control DACs.

Figure 3:
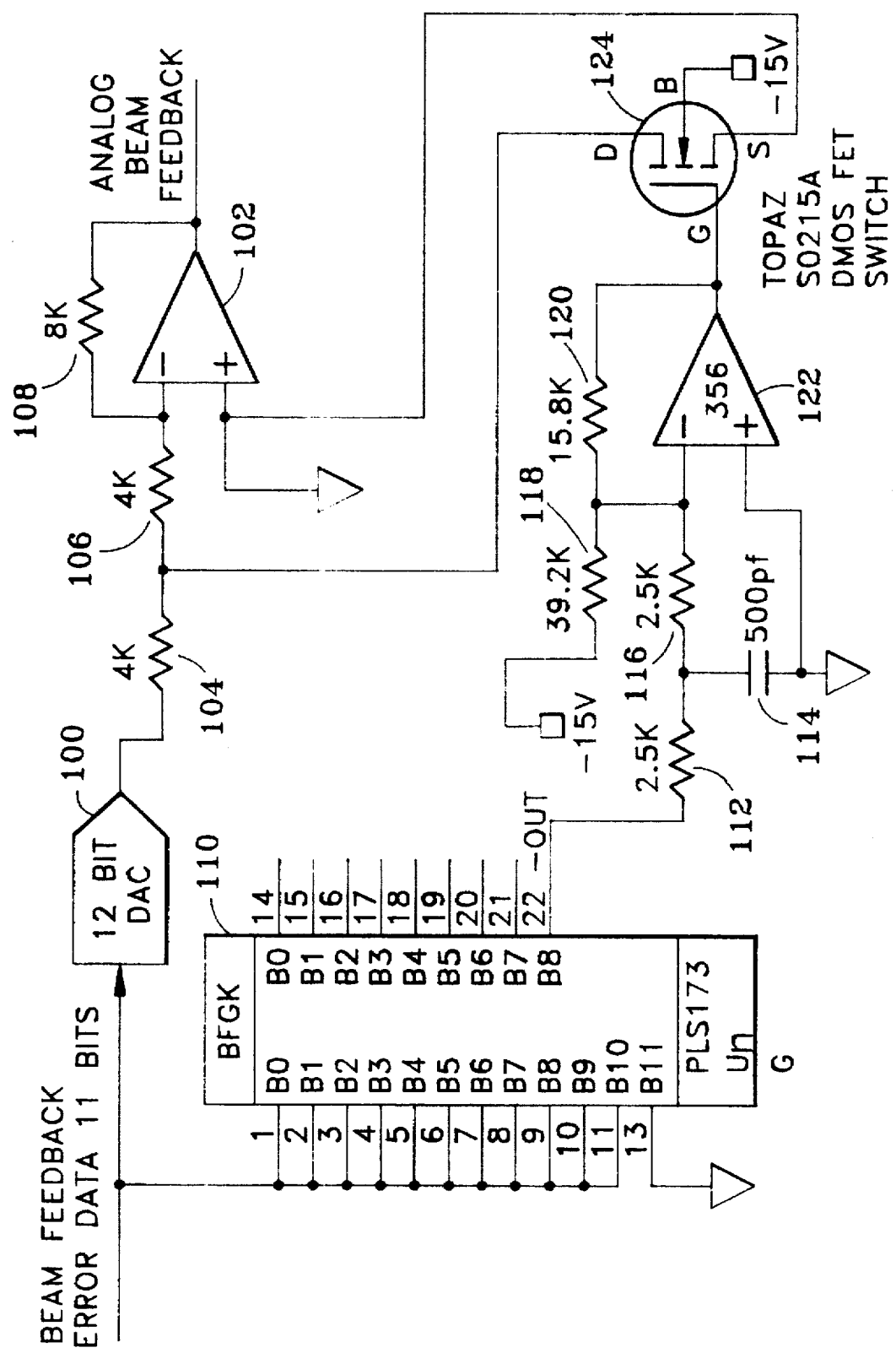
FIG. 3 is a glitch removal circuit for eliminating glitches in the preferred embodiment servo guided stage system.

FIG. 3 is a glitch removal circuit for eliminating glitches in the preferred embodiment servo guided stage system. The circuit of FIG. 3 is an 11 bit implementation of this glitch removal circuit for making an open loop real time correction to the position of an electron beam relative to a mechanical part.

Figures 4, 5:
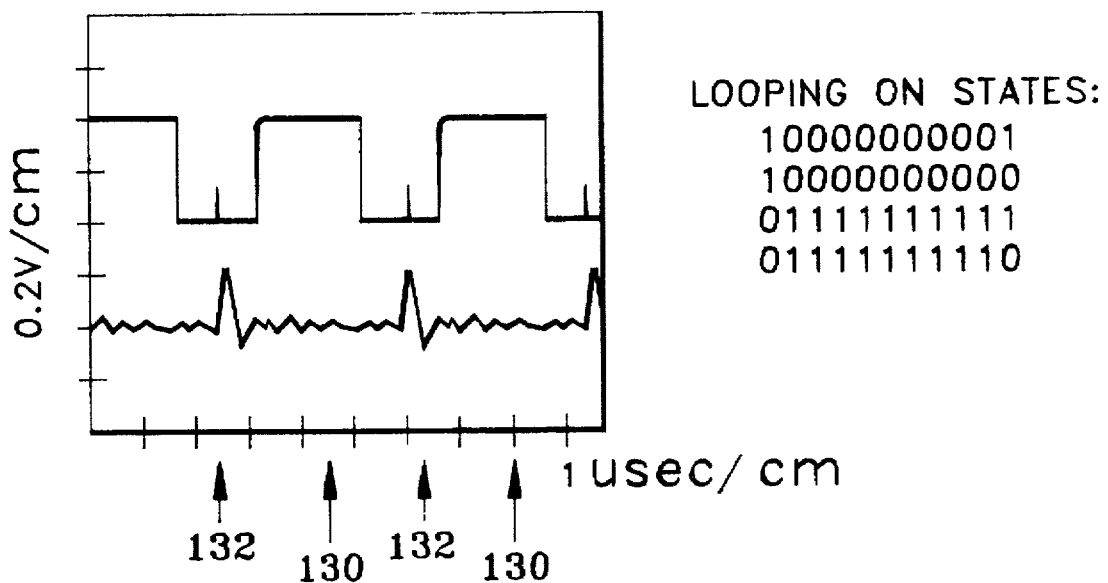
FIG. 4 is a truth table for programming the PAL 110 of the glitch removal circuit of FIG. 3.
FIG. 5 is a photograph of an oscilloscope trace of the output of the final amplifier 102 of FIG. 3.

The digital-mechanical positional error is measured by laser interferometer and the lowest 11 bits of the error are provided to each 12 Bit DAC 100. In the present example, 11 bits was sufficient to achieve the desired accuracy. However, if increased accuracy is required, more precise DACs and a wider digital error may be employed. The DAC output is provided to switchable unity gain amplifier formed by amplifier 102 which is biased at unity gain through resistors 104, 106 and 108. Simultaneously with being provided to the DAC, the same 11 bits are provided to a Programmable Array Logic (PAL) chip 110. In this embodiment the PAL 110 is a SIGNETICS PLS173. FIG. 4 is a truth table for programming the PAL 110. The PAL 110 is programmed to force output B8 to zero for both a 1000000000 and 01111111111 input code. Output B8 is a one for any other input code. It is the sequential occurrence of these two codes as an input to the DAC that causes the problem glitches. PAL output B8 is filtered through RC low pass filter 112, 114 and 116. The resistive network of 116, 118 and 120 in combination with amplifier 122 amplify and offset the filtered output B8 to match the input drive requirements of the DMOS FET switch 124. The RC low pass filters 112, 114, 116 attenuate signal band-width sufficiently to minimize gate to drain high frequency noise coupling through the FET switch 124. Closing the FET switch 124, isolates the switchable unity gain amplifier, shorting out its input at resistors 204, 106, which in turn forces amplifier 102 output to zero.

The bypassed codes, 10000000000 corresponds to zero volts and 01111111111 (binary −1) correspond to a voltage range of 9.76 mV. Thus, the DAC fitted according to FIG. 3 will have only a maximum 9.76 mV error, a considerable improvement over the 600 mV glitch in prior art stage positioning systems.

FIG. 5 is a photograph of an oscilloscope trace of the output (the bottom trace) of the final amplifier 102 of FIG. 3 looping through the state of greatest concern. The top trace is the inversion of PAL 110 ouput B8. The glitches are eliminated when the pulse output is high, the point 130 at which the problem glitch would normally occur. An artifact glitch 132 appears when the output is low and the input switches three binary levels from 01111111110 to 10000000001. However, in practice, because the glitches occur when the stage is stationary, the digital input will not change by more than 1 binary level at a time.

Another example of servo controlled stage systems where the present invention preferred embodiment servo controlled stage system could be employed is in servo controlled milling machines. In a system where a DAC is used to control the position of a milling machine cutting bit relative to a part being fabricated. The present invention would eliminate glitches that could cause a defect in the part.

Having recognized that the source of the pattern errors in "Wish You Were There" steppers is the E-Beam position DAC, several alternate embodiments will occur to those skilled in the art. For example, one alternate embodiment system would be to place a low pass filter on the DAC output instead of the de-glitching circuit of the preferred embodiment. Glitches have a broad frequency spectrum, and, especially, include high frequencies. Eliminating those high frequency components may sufficiently attenuate the glitch for many applications, such as for a milling tool. However, if all of the output glitches have the same polarity, filtered multiple glitches become additive. Consequently, a drift voltage would accumulate because the low pass filter would integrate low frequency and DC glitch components. Their integration would produce a DC error proportional to the magnitude and to the number of glitches in relation to the integration time constant of the low pass filter. Consequently, a low pass filter in the control circuit is not effective as the preferred embodiment approach. Furthermore, low pass filters are universally avoided in closed loop servo systems because they cause a negative phase shift that directly limits servo speed and accuracy.

Another alternate embodiment is a stage system wherein a band-pass filter is employed to eliminate both the high frequency and DC glitch components. However, while this alternate embodiment eliminates much of the glitch, it also blocks much of the DAC signal. It is, therefore, generally not acceptable for machine tool control servo systems or for lithography systems where the DC portion of the signal is essential.

Still another alternate embodiment is a sample and hold amplifier on the DAC's output. A sample-and-hold amplifier requires a clock signal to synchronize the sample and hold with changes in the DAC's digital input, i.e., in order to hold the previous analog output level. With proper timing, as the DAC output changes and the glitch occurs, the sample-and-hold output would remain constant. After the DAC's analog output becomes stable, by clocking the sample and hold, the stable DAC output is passed through and out of the sample and hold. However, this solution also has limitations in closed loop servos and correction systems. A time delay, i.e., the DAC's settling time, is added to the transit time for the signal path between the DAC and the tool. Consequently, a phase shift is introduced into the servo loop as with the low pass filter. Also, sample-and-hold circuits suffer from parasitic capacitance across the sampling switch that feeds high frequency signals through. As noted above, glitches have a large high frequency component. So, a major portion of glitches might be fed through the sample and hold. Consequently, sample-and-hold amplifiers may pass glitches instead of blocking them.

While the present invention is described in terms of preferred embodiments, it is understood that numerous variations and modifications will occur to a person skilled in the art without departing in spirit from the claimed invention. It is intended that the scope of the claims include those modifications and variations that fall within the spirit of the invention.

What we claim is:

1. A tool positioning control circuit comprising:

means for receiving positional information indicating a tool's position with respect to a workpiece;

aligning means for aligning said tool to said workpiece responsive to a control signal;

means for generating said control signal responsive to received positional information;

means for identifying an at rest condition of said tool; and means for blocking said control signal from being provided to said aligning means during said identified at rest condition.

2. The tool positioning control circuit of claim 1 wherein said means for blocking comprises:

an FET switch; and a switchable unity gain amplifier responsive to said FET switch.

3. The tool positioning control circuit of claim 2 wherein said means for identifying an at rest condition generates a blocking signal whenever said at rest condition is detected, and said blocking means includes attenuation means for attenuating and shifting said blocking signal.

4. A positioning system for positioning a workpiece and a tool relative to said workpiece, said positioning system comprising:

a servo guided stage system for positioning a workpiece and holding said workpiece in place; and a tool positioning system for positioning a tool relative to said in place workpiece, said tool positioning system including a tool control circuit comprising:

means for receiving positional information indicating the position of said tool, aligning means for aligning said tool to said workpiece responsive to received said positional information, means for generating control signals responsive to said received positional information, means for identifying an at rest condition of said tool, and means for blocking said control signals from being provided to said aligning means during said at rest condition.

5. The tool positioning control circuit of claim 4 wherein said means for blocking comprises:

an FET switch; and a switchable unity gain amplifier responsive to said FET switch.

6. The tool positioning control circuit of claim 5 wherein said means for identifying an at rest condition generates a blocking signal whenever said at rest condition is detected, and said blocking means includes attenuation means for attenuating and shifting said blocking signal.

7. The stage and tool positioning system of claim 4 wherein said tool is an E-beam photolithography tool.

8. The stage and tool positioning system of claim 4 wherein said tool is an E-beam probe.

9. A stage and tool positioning system for positioning a workpiece in relation to a tool comprising:

a servo guided stage system for supporting a workpiece; and, a tool positioning system for positioning a tool above said workpiece and having a tool control circuit for controlling said tool positioning system comprising:

a logic circuit for decoding a DAC binary input and providing a logic level when said input is set at the DAC's midrange or one bit below said DAC's midrange, an attenuation amplifier for attenuating and filtering said provided logic level, a switchable unity gain amplifier for selectively passing said DAC's analog output, and an FET gated by said attenuated and filtered logic level, said switchable unity gain amplifier being switched by said FET, whereby said DAC output is block from said switchable unity gain amplifier whenever said FET is on.

* * * * *